Aug. 19, 1930.  R. C. LEWIS  1,773,367
MACHINE FOR TREATING RUBBER AND SIMILAR MATERIAL
Filed March 10, 1925  6 Sheets-Sheet 6
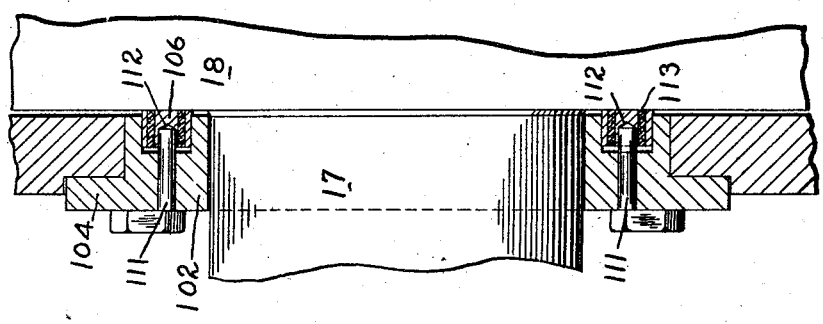
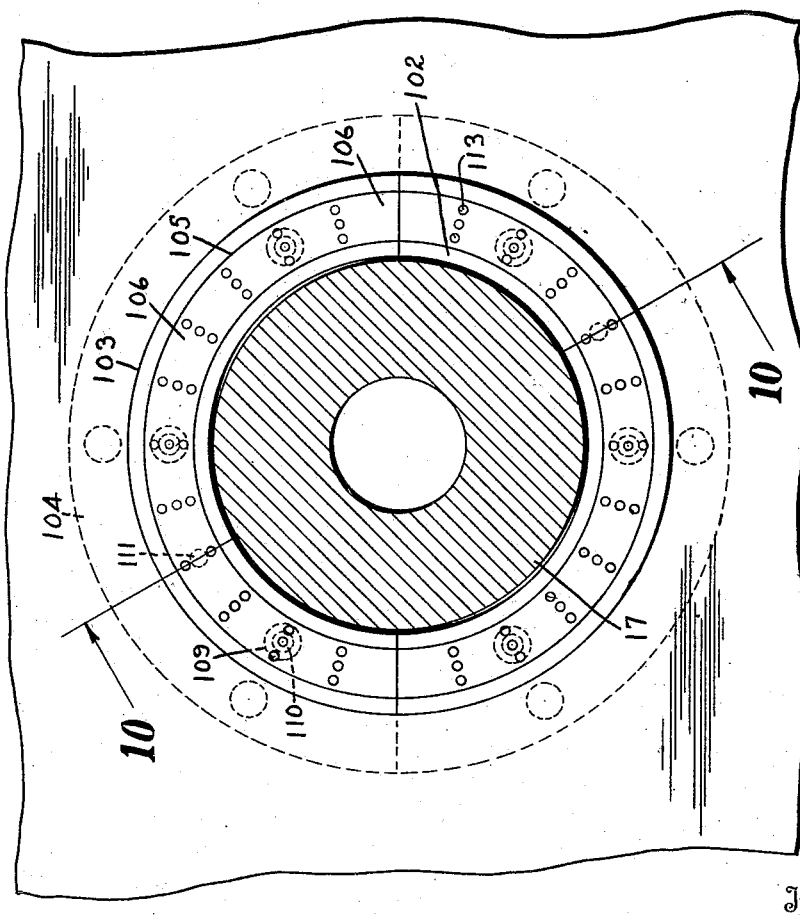

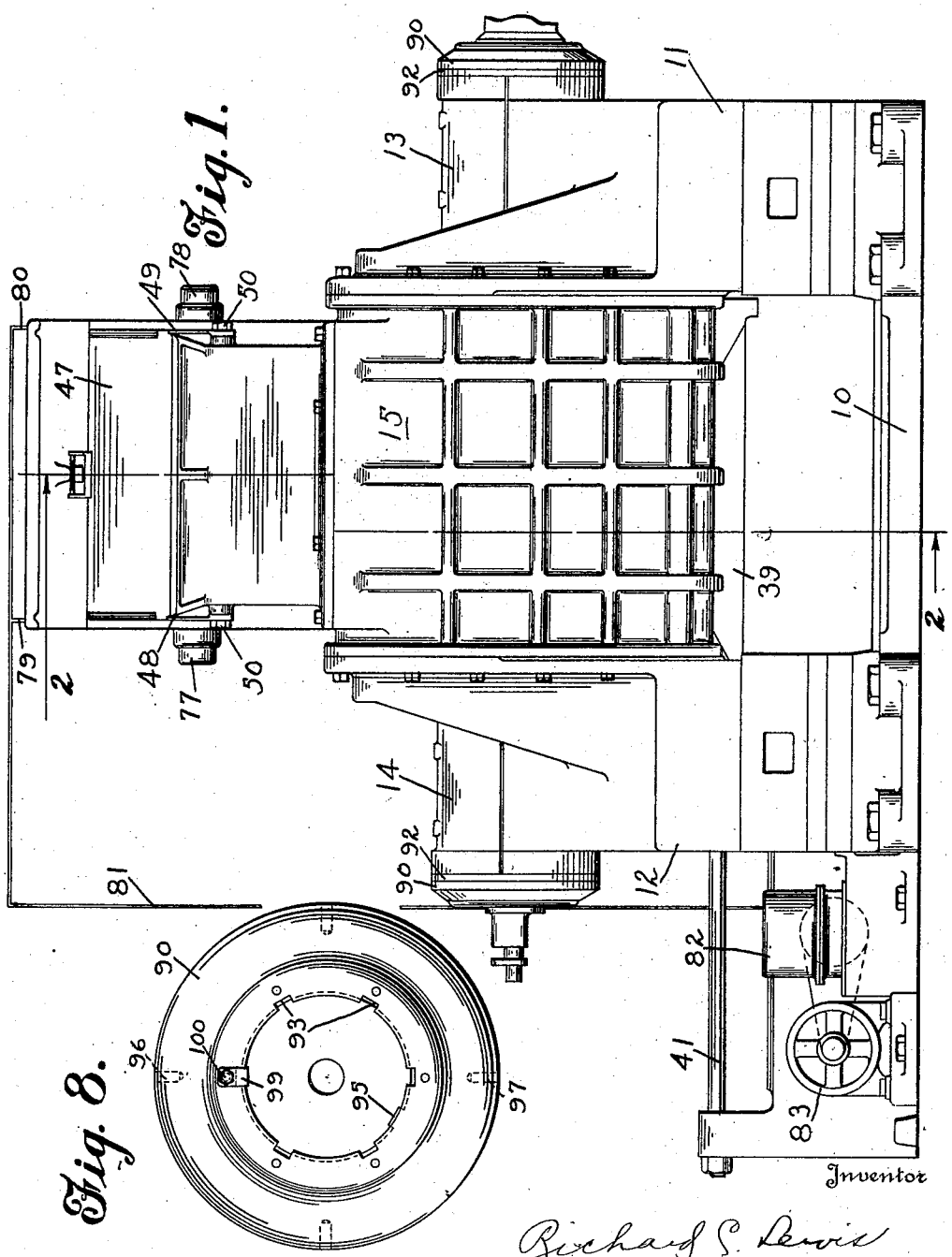

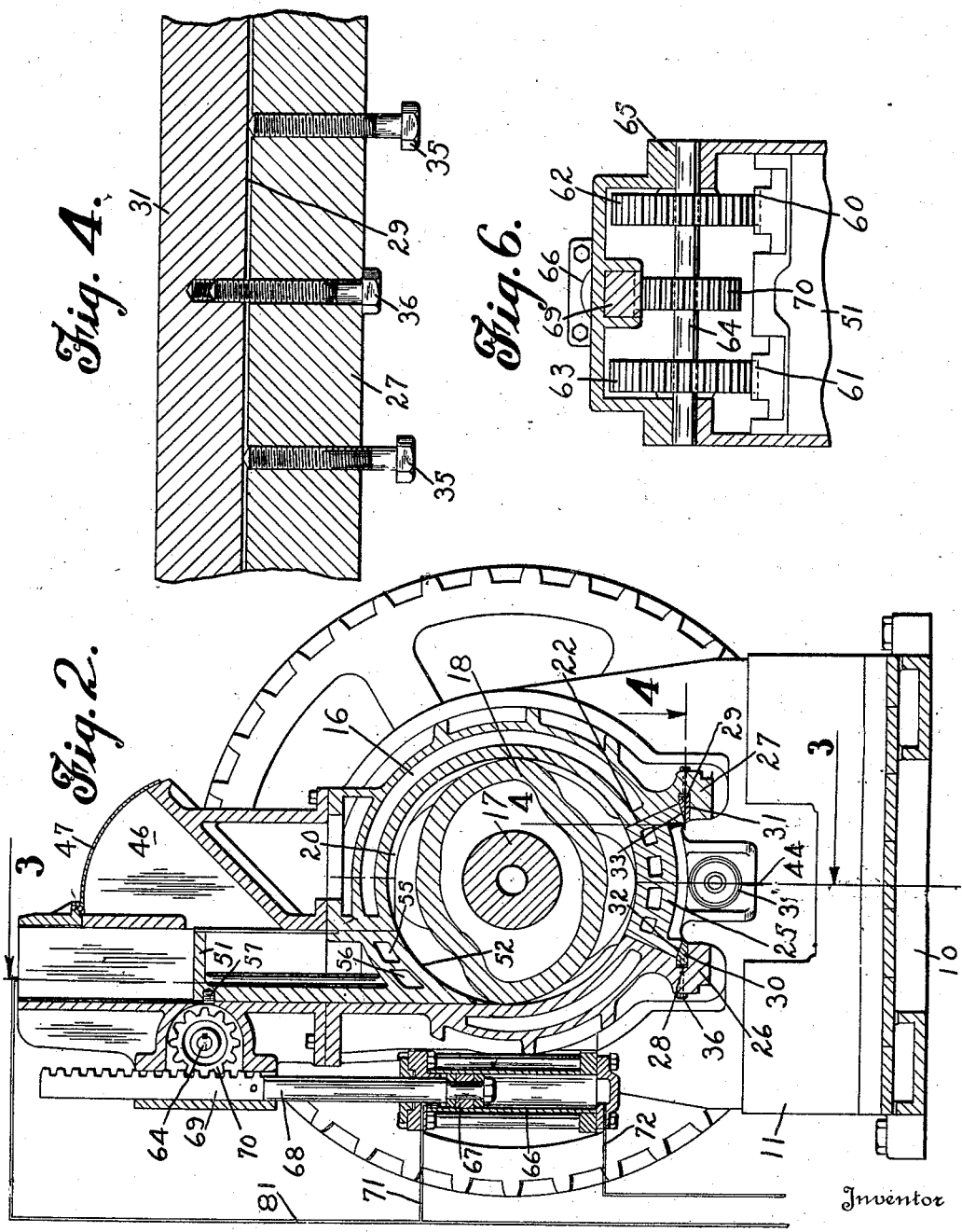

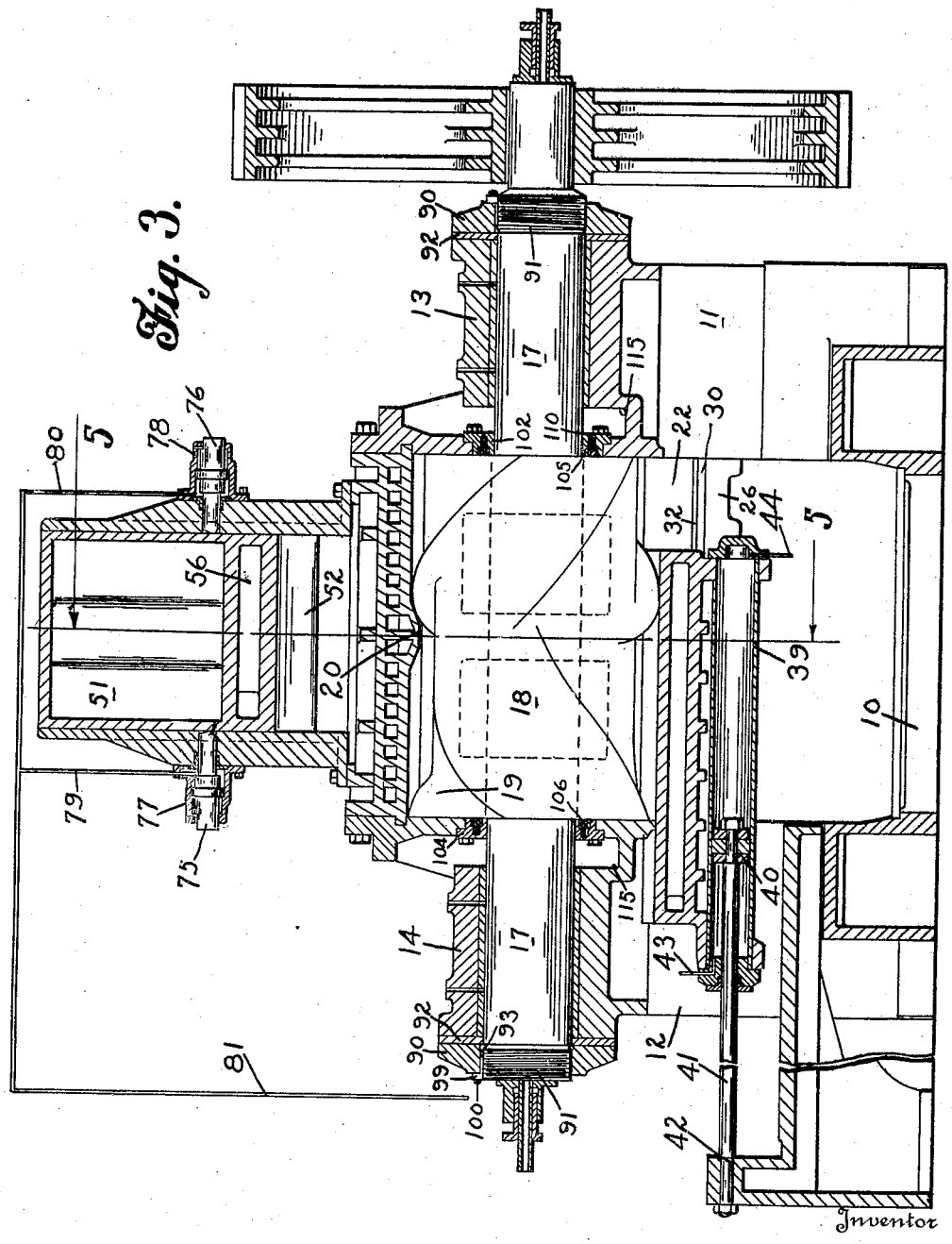

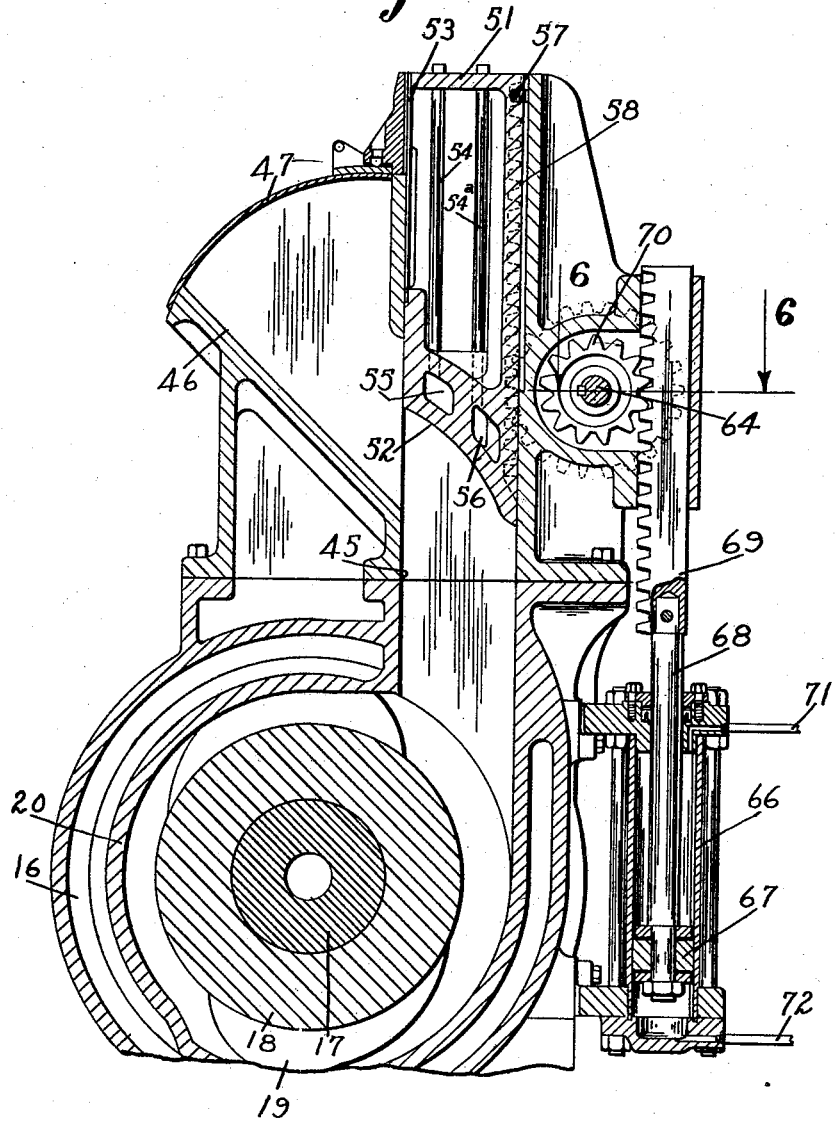

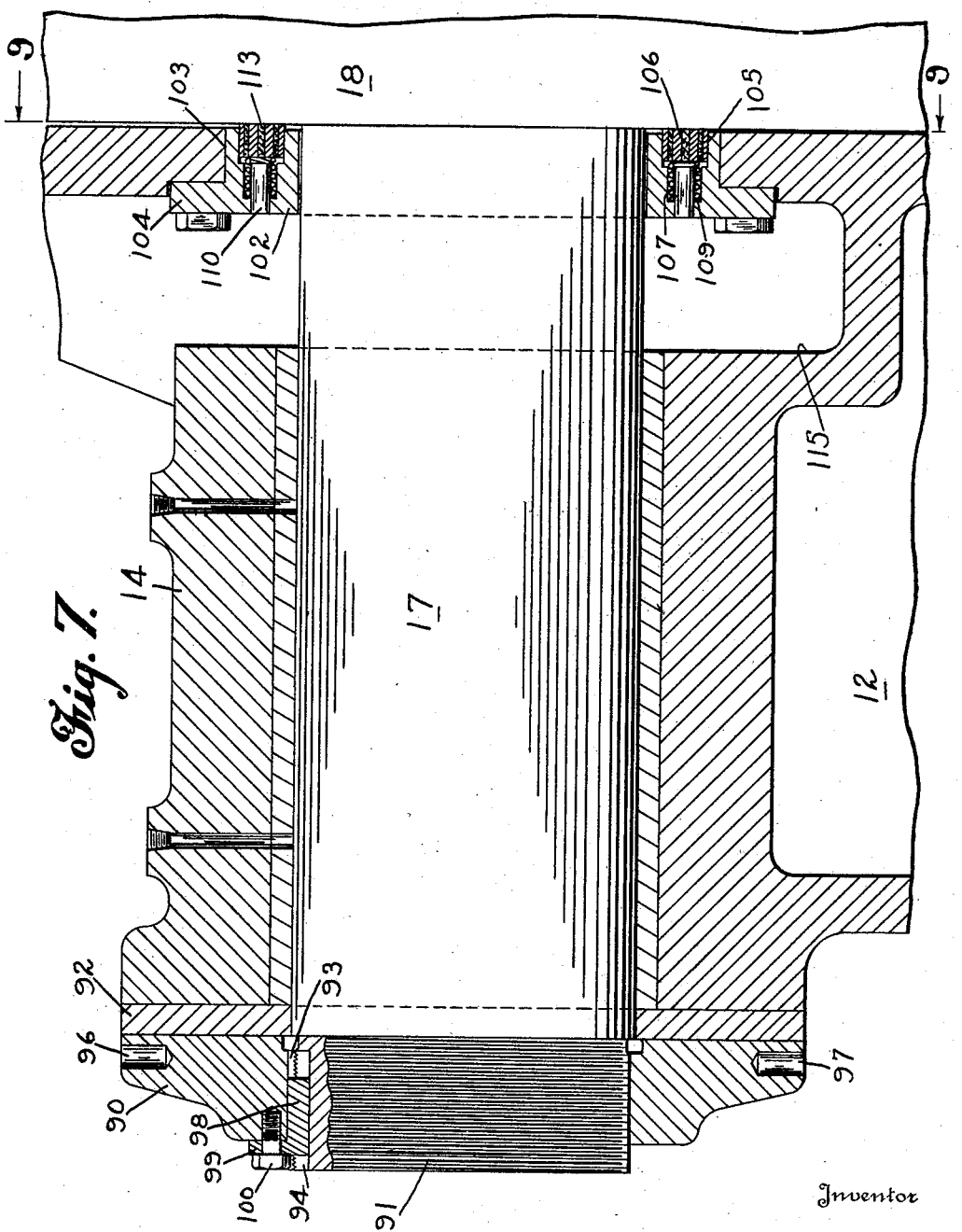

Patented Aug. 19, 1930

1,773,367

UNITED STATES PATENT OFFICE

RICHARD C. LEWIS, OF ANSONIA, CONNECTICUT, ASSIGNOR, BY MESNE ASSIGNMENTS, TO FARREL-BIRMINGHAM COMPANY, INCORPORATED, OF ANSONIA, CONNECTICUT, A CORPORATION OF CONNECTICUT

MACHINE FOR TREATING RUBBER AND SIMILAR MATERIAL

Application filed March 10, 1925. Serial No. 14,451.

This invention relates to machines for treating rubber and similar material, and relates especially to machines for mixing, masticating, working or kneading rubber which is to be used for various industrial purposes. It will be obvious, however, that my improvements are not limited to a device of the particular character shown in the drawings for the purpose of illustrating a preferred embodiment of the invention.

As devices of this character are usually relatively large and heavy machines, and as they usually comprise a mixing rotor rotating within a closed chamber, it is advantageous to provide devices for controlling the charging and discharging openings which may be expeditiously and easily operated, and which will at the same time fit the openings closely so as to prevent any leakage of the material therefrom during the operation of the machine.

Moreover, it often occurs that trouble is experienced in such machines due to the contents of the chamber working out around the rotor shaft, as the action of the rotor develops considerable pressure in a direction axially of the shaft and tends to force the material out through the shaft packing.

One object of my invention, therefore, is to provide an improved charging device for a rubber treating machine of this character.

Another object of the invention is to provide an improved discharge controlling door for a device of this character, and to arrange this door or closure member so that it may fit the discharge opening tightly.

A still further object of my invention is the provision of improved means for preventing the charge of material in the chamber from coming in contact with the bearings of the rotor shaft so that leakage of the material about this shaft is prevented.

Other objects of the invention are to improve generally the operation of the machine, to provide improved thrust bearings for the rotor shaft and improved means for adjusting such bearings so that any play that develops in the rotor may be taken up.

To these and other ends the invention consists in the novel features and combination of parts to be hereinafter described and claimed.

In the accompanying drawings:

Fig. 1 is a front elevation of a rubber mixing machine embodying my invention;

Fig. 2 is a transverse sectional view on line 2—2 of Fig. 1;

Fig. 3 is a longitudinal sectional view on line 3—3 of Fig. 2;

Fig. 4 is a sectional view through one of the bearing members of the lower discharge door taken on line 4—4 of Fig. 2;

Fig. 5 is an enlarged transverse sectional view on line 5—5 of Fig. 3;

Fig. 6 is a sectional view on line 6—6 of Fig. 5;

Fig. 7 is an enlarged sectional view through one of the rotor bearings;

Fig. 8 is an end view of the thrust collar for the rotor shaft;

Fig. 9 is a sectional view taken on line 9—9 of Fig. 7;

Fig. 10 is a sectional view taken on line 10—10 of Fig. 9.

The rubber mixing machine which I have selected to illustrate and describe as a preferred embodiment of my invention, comprises a main base 10 from which rise pedestals 11 and 12 provided at their upper ends with bearings 13 and 14 to support the ends of the rotor shaft. Between these pedestals is supported the mixing chamber 15. The walls of this chamber are hollow to provide a water jacket 16 by means of which the temperature of the chamber may be controlled. The rotor shaft 17 mounted in the bearings 13 and 14 extends through the chamber, and mounted upon this shaft within the chamber is the rotor 18 provided with blades 19 to work and knead the material and smear it against the curved, cylindrical surface of the chamber. In the embodiment of my invention shown in the drawings, one rotor only is employed, and the chamber is of substantially cylindrical shape.

At the central portion of this chamber an extrusion rib 20 is provided, this rib projecting inwardly from the wall so that the blades of the rotor force the material back and forth from one end of the chamber to the other past this rib.

At the lower portion of the chamber is provided a discharge opening 22, the side walls of this opening extending outwardly in a direction substantially normal to the inner surface of the chamber. This discharge opening is closed by means of a sliding door 25, the side edges of which are tapered to conform to the edges of the opening 22, so that the door or closure member will fit this opening closely and prevent leakage of material from the chamber when the door is closed. This door is mounted upon supports 26 and 27, which, as shown in Fig. 2, are formed integrally with the chamber and project downwardly therefrom so that they lie below the lower edges of the door. These supports are provided with recesses 28 and 29, and within these recesses are bearing blocks or plates 30 and 31, the upper surfaces of which are beveled, as shown at 32 and 33, and the closure member 25 rests upon the upper beveled surfaces of these members.

Set-screws 35 are threaded into the supports 26 and 27, the ends of these screws bearing against the outer edges of the blocks 30 and 31. Between the set-screws 35 are similar screws 36 passed through openings in the supports 26 and 27 and threaded into the bearing blocks. It will be apparent that, as shown in Figs. 2 and 4, by rotating these screws the bearing blocks may be adjusted toward each other so as to wedge the door upwardly to make a tight fit at all times with the discharge opening 22. It will be apparent that any wear may be taken up in this way, and that due to the tapered edges of the opening and door a tight fit between the parts may be maintained at all times.

As shown in the drawings, the discharge door is operated by means of fluid pressure, a cylinder 39 being secured to the lower side of the door, and within this cylinder is mounted a piston 40 upon a piston rod 41 which projects without the cylinder and is secured at its end 42 to the base of the machine. Compressed air or a liquid under pressure may be admitted to the cylinder through the pipes 43 and 44 to open and close the sliding door.

The charging of the chamber is effected at its upper portion, and for this purpose a charging stack 45 communicates with the chamber. As shown, this stack is located adjacent the rear end of the chamber, but it may be positioned directly over the rotor if desired. A hopper 46 communicates with this stack, and material deposited in the hopper will pass downwardly through the stack into the chamber. A closing member 47 is provided for the hopper, this member being connected to the outer ends of the arms 48 and 49 pivoted at 50 at the side of the stack.

The charging opening is controlled by means of a plunger 51 slidably mounted within the stack 45, this closure being provided with a curved lower surface 52 to conform to the shape of the chamber when the plunger is in its lowered position so that when the chamber is closed it will present a substantially continuous cylindrical mixing surface As shown, the plunger is hollow, its front portion being closed by a plate 53, and pipes 54 and 54ª may be provided whereby a cooling liquid may be supplied to the water jackets 55 and 56 therein. A stop 57 is secured at the rear side of the plunger, which stop cooperates with a slot 58 formed in the adjacent surface of the stack to limit the downward movement of the plunger, the stop coming into contact at the proper time with the lower end of the slot.

Upon the rear side of the plunger are provided two series of rack teeth 60 and 61 with with which mesh the teeth of pinions 62 and 63 mounted upon a shaft 64 suitably journalled in a housing 65 upon the stack. It will be apparent that when the shaft 64 is rotated, the plunger is operated thereby in its movements in the stack, and may be caused to assume a lower position wherein the chamber is effectually closed, as shown in Fig. 2, or an upper position, shown in Fig. 5, wherein the hopper 46 is placed in communication with the chamber.

To operate the plunger, I have provided a cylinder 66 within which is mounted a piston 67 upon a piston rod 68 connected at its upper end to a rack bar 69, the teeth of which are in mesh with a pinion 70 secured to the shaft 64. Fluid pressure may be admitted to opposite ends of the cylinder through the pipes 71 and 72, and it will be apparent that the plunger may be conveniently and easily controlled in its movements by means of this structure.

Slidably mounted in the sides of the stack 45, as shown more particularly in Fig. 3, are a pair of lock-bolts 75 and 76, so arranged that they may be projected inwardly so that their ends take over the upper ends of the plunger when the latter is in its operating position, shown in Fig. 2, and firmly secure the plunger in position to close the chamber. These lock-bolts are arranged in chambers 77 and 78, and fluid pressure may be admitted to these chambers through the pipes 79 and 80 to withdraw these bolts from above the plunger to permit the latter to be raised to charging position. These pipes 79 and 80 are branches of a pipe 81 with which communicates the pipe 71 which enters the upper end of the cylinder 66, so that when fluid pressure is admitted to the upper end of this cylinder to raise the plunger it will at the same time be admitted to the chambers 77 and 78 to withdraw the lock-bolts from above the plunger.

The various fluid pressure pipes which communicate with the cylinders 39 and 66 and the chambers 77 and 78 all lead to an oil pump 82 mounted upon the base 10 of the machine, this pump being operated by a motor 83, so that the power to operate the various moving parts of the machine other than the rotor is supplied from this motor which is a unitary part of the structure.

In order to take up any play which may develop in the rotor during the continued operation of the machine, I have provided end thrust collars 90 adapted to be screwed upon the ends of the shaft, which ends are threaded, as shown at 91, for the reception of these collars. Between the inner surfaces of the collars and the bearings for the rotor shaft may be positioned thrust plates 92 made of bronze or similar material. The periphery of the threaded opening of each of the collars 90 is provided with a series of recesses 93, six of which are shown in the drawing, but the number may, of course, be varied if desired. Each of the ends of the rotor shaft is provided with complemental recesses 94 and 95, shown more especially in Figs. 7 and 8. When making adjustments to take up the play in the rotor shaft, the collar 90 is turned by means of a spanner wrench, not shown, suitably formed so as to be engaged with the holes 96 or 97 in the collar until the play is taken up to the desired extent and one of the recesses 93 is brought into register with one of the recesses 94 or 95 of the shaft. The body portion of an L-shaped key 98 is then inserted into the two registering recesses, the flange 99 of this key being bolted to the collar 90 by means of the bolt 100 to secure it in place. While the number of recesses 94 and 95 in the shaft may be varied as desired, two of these are shown, and are so spaced that when one of them is in register with a corresponding notch 93 the other will lie midway between these notches. By this construction I am enabled to adjust the thrust collar 90 one-twelfth of a turn, or to a movement through an arc equal to one-half of the distance between the recesses 93. By giving the threads 91 upon the rotor shaft a pitch of six threads to the inch, it will be seen that when the collar is adjusted to one-twelfth of a turn, adjustments may be made longitudinally of the rotor shaft to one seventy-second of an inch. This, of course, may be varied if desired, by increasing the number of recesses in the thrust collar. While in Fig. 7 I have shown this structure in detail at one end of the rotor shaft only, it will be understood that the same may and preferably is employed also at the opposite end.

In machines of this character wherein the charge in the chamber is worked back and forth therein toward the chamber ends, there is a constant tendency for the material within the chamber to work out of the chamber ends around the rotor shaft. Experience has shown that in fact there is a considerable pressure to force the material out of the chamber around the rotor shaft in a direction axially of the shaft. To obviate this tendency I have arranged a packing for the chamber ends such that the material will be caught and stopped prior to its contact with the rotor shaft so that it will not reach the openings formed in the chamber ends for this shaft, and hence will not be subjected to the pressure referred to which causes it to be expelled from the chamber.

For this purpose I have provided a packing ring holder 102 of annular shape designed to surround the rotor shaft and to lie within the opening 103 formed in the end wall of the chamber for the passage of the shaft therethrough. This member is provided with a peripheral flange 104 by which it is secured to the chamber, as clearly shown in Fig. 7, and is provided with an annular recess 105 which opens through its inner face and acts as a seat for the packing ring 106. The packing rings are pressed outwardly against the rotor 18 by means of springs 107 reacting against the inner face of the packing ring and against the bottoms of the recesses 109 formed in the ring holder 102. These springs are suitably guided upon pins 110 set into the ring holder at suitable intervals about its circumference. It will be apparent, therefore, that this ring is pressed outwardly against the rotor by means of these springs so as to contact closely with the end face of the rotor and prevent the passage of any material to a point within the ring adjacent the rotor shaft where it might be forced out from the chamber around this shaft.

To prevent the creeping of the packing ring about the rotor, a pair of pins 111 are set into the ring holder 102, the ends of which are designed to be received in openings 112 formed in the inner face of the packing ring. This ring may be formed of any suitable soft material such as bronze or the like, and may be drilled in a number of places, as shown at 113. These drill holes are filled with a lubricant, such as graphite, to reduce the wear between the parts.

As shown in Fig. 9, both the packing ring holder 102 and the packing ring 106 are split or made in two halves so that they may be readily assembled around the rotor shaft, and removed if desired without disturbing the shaft bearings 13 and 14. To provide for access to the ring holder 102, the bearings 13 and 14 are spaced from the end walls of the chamber, as shown in Fig. 7, so as to provide a recess 115 into which tools may be inserted for the unscrewing of the bolts which pass through the flange 104. It will, of course, be understood that, while in Figs. 7, 9 and 10 the packing ring is shown at one end of the chamber only, I contemplate its use at both ends of the rotor.

While experience has shown that there is a considerable force exerted due to operation of the machine to force the material within the chamber longitudinally of the rotor shaft, and hence there is a likelihood of this material working out around the rotor bearings, there is very little tendency for the material to work toward the rotor shaft from the periphery of the chamber at the ends thereof, and so the packing rings, placed as they are to catch the material as it works inwardly toward the rotor shaft, are quite effective in operation, and not compelled to withstand the pressure that would have to be withstood by a packing placed around the rotor in the opening in the end wall of the chamber.

The plunger or follower operating means herein described is very efficient, and, moreover, by disposing the plunger actuating mechanism alongside the stack and plunger, the machine is made very compact. As this mechanism is disposed substantially wholly below the top of the stack, the height of the stack substantially determines the height of the machine, and the vertical dimension of the machine is considerably reduced as compared to those prior machines where the actuating mechanism for the plunger is disposed above and in line with the latter. In my machine the stack is substantially unobstructed in the space above the plunger, and the machine can be received and operate in a room of less height than has heretofore been possible with machines of this general type.

While I have shown and described some preferred embodiments of my invention, it will be understood that it is not to be limited to all the details shown but is capable of modification and variation within the spirit of the invention and within the scope of the appended claims.

I do not claim herein a rubber mixing machine having a chamber with an opening therein, a closure adapted to be moved to position to close said opening, a bolt movably mounted adjacent said closure and adapted to engage over the end of the latter to lock the closure in a closed position, and fluid pressure actuated means to withdraw the bolt from engaging position, or other features claimed in my application, Serial No. 14,450, filed March 10, 1925.

What I claim is:

1. A rubber treating machine having a mixing chamber provided with a curved inner surface, a charging stack communicating with the chamber through an opening therein, a plunger slidably mounted in the stack and having a curved bottom surface to close the opening and complement the inner surface of the chamber, cooperating means on the plunger and the wall of the stack to limit the movement of the plunger toward the chamber, said means comprising a cooperating stop pin and groove provided respectively on said members and means cooperating with said stop pin and groove adapted to secure said plunger against movement.

2. A rubber treating machine having a mixing chamber provided with a curved inner surface, a charging stack communicating with the chamber through an opening therein, a plunger slidably mounted in the stack and having a curved bottom surface to close the opening and complement the inner surface of the chamber, cooperating means on the plunger and the wall of the stack to limit the movement of the plunger toward the chamber, said means comprising a stop pin mounted on a wall of the plunger and projecting therefrom, and a groove in the adjacent wall of the stack to receive said pin and means cooperating with said stop pin and groove adapted to secure said plunger against movement.

3. A rubber treating machine comprising a chamber, a charging stack communicating with the chamber, a plunger slidably mounted in the stack, and means to raise and lower said plunger comprising a series of rack teeth provided on one surface thereof, a rack member slidably mounted on the wall of the stack in parallel relation with said series of teeth, means for moving said rack member, and means for imparting motion from said rack member to the plunger through the series of teeth thereon.

4. A rubber treating machine comprising a charging chamber, a stack communicating with said chamber, and a plunger slidably mounted in said stack, and means to move said plunger comprising a pair of rack members with one of which the plunger is provided, means to actuate the other rack member, and connecting means between said racks comprising a shaft and a pinion mounted thereon.

5. A rubber treating machine comprising a chamber, a charging stack communicating with the chamber, a plunger slidably mounted in the stack, and means to raise and lower said plunger comprising a series of rack teeth provided on one surface thereof, a rack member slidably mounted on the wall of the stack in parallel relation with said series of teeth, a shaft mounted on the stack between said rack member and said plunger, and pinions on said shaft engaging the teeth of the rack member and plunger.

6. A rubber treating machine comprising a chamber, a charging stack communicating with said chamber, and a plunger slidably mounted in said stack, said plunger being provided with a series of rack teeth upon one side thereof, a pinion rotatably mounted upon the stack and adapted to engage said rack teeth, and means to rotate said pinion including a rack bar movably mounted relatively to the stack, and actuating means for said bar.

7. A rubber treating machine comprising a chamber, a charging stack communicating with said chamber, a plunger slidably mounted in the stack and provided upon a wall thereof with two series of rack teeth vertically arranged, a rack bar slidably mounted on the stack in parallel relation with the series of teeth on the plunger, a shaft rotatably mounted on the stack between the rack bar and plunger, said shaft carrying a pair of pinions, the teeth of each of which meshes with one of the series of rack teeth on the plunger, and a third pinion intermediate the two first named pinions, the teeth of which meshes with those of the rack bar.

8. A rubber treating machine comprising a chamber, a charging stack communicating therewith, a plunger slidably mounted in said stack, a plunger actuating member mounted on the stack parallel to the plunger and for parallel movement with the plunger, means for moving said member, and means for transmitting motion from said member to the plunger.

9. A rubber treating machine comprising a chamber, a charging stack communicating with the chamber, a plunger mounted in said stack for sliding movements toward and from the chamber, a plunger actuating member movably mounted adjacent and parallel to the wall of the stack, means for moving said member, and means extending through the wall of the stack for transmitting motion therefrom to the plunger to raise and lower the latter.

10. A rubber treating machine comprising a chamber, a charging stack communicating with the chamber, a plunger mounted in said stack, said plunger being provided with a series of rack teeth upon one wall thereof, a shaft rotatably mounted on the stack and carrying a pinion engaged with said rack and teeth, and means for actuating said shaft comprising a second pinion secured to the shaft, and a rack bar engaged with said pinion.

11. A rubber treating machine comprising a chamber, a charging stack communicating with said chamber, and a plunger slidably mounted in said stack, said plunger being provided upon a wall thereof with two series of rack teeth, a shaft rotatably mounted upon the stack and carrying pinions engaged respectively with the said series of rack teeth, a third pinion on said shaft, a rack bar slidably mounted on the stack having its teeth engaged with those of the third pinion.

12. A rubber treating machine comprising a chamber, a charging stack communicating with said chamber and a plunger slidably mounted in the stack, said plunger being hollow and provided with passageways for a cooling fluid, a hopper communicating with the stack through a wall thereof, and a plate secured on the plunger adjacent the hopper to close communication between the stack and hopper and prevent the charge of material from entering the plunger.

13. A rubber treating machine comprising a chamber, a charging stack communicating with the chamber, a plunger mounted in said stack, said plunger being provided with a series of rack teeth upon one wall thereof, a shaft rotatably mounted on the stack and carrying a pinion engaged with said rack and teeth, and means for actuating said shaft, comprising a second pinion secured to the shaft, and a rack bar engaged with said pinion, and means to limit the movement of the plunger toward the chamber.

14. A rubber mixing machine comprising a chamber having a discharge opening at the lower side thereof, and a closure member to control said opening, the walls of said chamber being continued downwardly adjacent said opening to form supporting shoulders, the closure member being slidably mounted on said shoulders, and means for adjusting the closure member to wedge it tightly into the opening.

15. A rubber treating machine having a chamber, the wall of said chamber being provided at its bottom portion thereof with a discharge opening having tapered walls and a correspondingly shaped closure member to close said opening, and means for adjusting the position of said closure member to wedge it into said opening to take up wear on the parts.

16. A rubber treating machine having a chamber, the wall of said chamber being provided at its bottom portion thereof with a discharge opening having tapered walls and a correspondingly shaped slidable closure member to close said opening, and means for adjusting the supports for said closure member to wedge it tightly into said opening.

17. A rubber treating machine having a chamber, the wall of said chamber being provided with a discharge opening adjacent the lower side thereof, a sliding closure member to control said opening, supports upon which said member is mounted, and means for adjusting said supports to urge the closure member into tight contact with the edges of the chamber opening.

18. A rubber treating machine having a chamber, the wall of said chamber having a discharge opening in its lower portion, a closure member for said opening, means for slidably supporting said closure member, including a pair of wear plates upon which the closure is mounted, and means for adjusting said plates to urge the closure into close contact with the edges of the chamber opening.

19. A rubber treating machine having a chamber, the wall of said chamber having a discharge opening in its lower portion, a closure member for said opening, means for slidably supporting said closure member, including a pair of wear plates, said wear plates having inclined surfaces upon which the closure member moves, and means for adjusting said plates.

20. A rubber treating machine having a chamber, the wall of said chamber having a discharge opening in its lower portion, a closure member for said opening, means for slidably supporting said closure member, including a pair of wear plates, said wear plates having inclined surfaces upon which the closure member moves, and means for effecting a lateral adjustment of said wear plates to cause said inclined surfaces to wedge the closure member toward the opening.

21. A rubber treating machine comprising a mixing chamber, the wall of said chamber being provided with a discharge opening at its lower portion, a slidable closure member to said opening, supporting means for said member, wear plates adjustably mounted on said supporting means, and said closure member being slidably carried by the upper surfaces of said wear plates.

22. A rubber treating machine comprising a mixing chamber, the wall of said chamber being provided with a discharge opening at its lower portion, a slidable closure member to said opening, supporting means for said member, wear plates adjustably mounted on said supporting means, and said closure member being slidably carried by the upper surfaces of said wear plates, and means for effecting the adjustment of said wear plates to urge the closure member toward the chamber.

23. A rubber treating machine having a chamber, the wall of the chamber being provided with a discharge opening having tapered edges, a slidable closure member having correspondingly tapered edges, means for supporting said closure member, wear plates mounted on said means and having the closure member slidably mounted upon the upper surfaces thereof, and means for effecting adjustment of said wear plates to wedge the closure member into the tapered opening.

24. A rubber treating machine having a chamber, the wall of the chamber being provided with a discharge opening having tapered edges, a slidable closure member having correspondingly tapered edges, means for supporting said closure member, wear plates adjustably mounted on said supporting members and having inclined upper surfaces upon which the closure member is carried, and means for effecting lateral adjustment of said wear plates so that the inclined upper surfaces thereof wedge the closure member toward the edges of the opening.

25. A rubber treating machine having a chamber, the wall of said chamber having a discharge opening in the lower portion thereof, said opening being provided with tapered edges, the chamber wall being continued downwardly adjacent said opening to form supporting shoulders, wear plates adjustably mounted on said shoulders, and a closure member having its edges tapered to correspond with those of the opening mounted upon said wear plates, the said plates having inclined upper surfaces so that adjustment thereof wedges the closure member against the edges of the opening.

26. A rubber treating machine having a chamber, a rotor mounted upon a shaft therein, end bearings for the rotor shaft, and means for taking up end play in the shaft, comprising a thrust collar threadedly mounted upon one end of the rotor shaft and adapted to bear against the end of the corresponding bearing, and means for securing said thrust collar in various positions of threaded adjustment upon said shaft, said means comprising recesses formed in said shaft and collar and adapted to be brought into register and a key inserted in the registering recesses.

27. A rubber treating machine having a chamber, a rotor mounted upon a shaft therein, end bearings for the shaft, and means for taking up longitudinal play in the shaft comprising thrust collars threaded upon opposite ends thereof and adapted to bear against the end faces of the bearings, and means for securing each of said thrust collars in adjusted position along the shaft, comprising a recess formed at the periphery of the shaft, a corresponding recess formed in the bore of the collar, said recesses being adapted to be brought into register, and a key for insertion into said registering recesses.

28. A rubber treating machine having a chamber, a rotor mounted upon a shaft therein, end bearings for the shaft, and means for taking up longitudinal play in the shaft comprising thrust collars threaded upon opposite ends thereof and adapted to bear against the end faces of the bearings, and means for securing each of said thrust collars in adjustable position along the shaft comprising a number of recesses formed at the periphery of the shaft and spaced therearound, a plurality of recesses formed in the bore of the collar and spaced differently from those in the shaft, and a key adapted to be inserted into said recesses when brought into registration.

29. A rubber treating machine having a chamber, a rotor mounted in said chamber, the rotor shaft extending through the end walls of the chamber, packing rings surrounding the rotor shaft within the chamber between the end wall of the chamber and the end surface of the rotor to prevent parts of the charge of material from moving radially of the chamber between the end wall thereof and the rotor and reaching the shaft and means for introducing said packing rings through the end walls of said chamber.

30. A rubber treating machine having a chamber, a rotor in the chamber, a shaft for the rotor passing through openings in the end walls of the chamber, packing rings within the chamber surrounding said openings and closing the space between the end faces of the rotors and the end walls of the chamber to prevent the material of the charge from reaching the openings and means for introducing said packing rings through the end walls of said chamber.

31. A rubber treating machine having a chamber, a rotor in the chamber, a shaft for the rotor passing through openings in the end walls of the chamber, members surrounding said shaft and received within the openings to form a portion of the wall of the chamber and packing rings mounted upon the members and surrounding said shaft, said packing rings being adapted to bear against the end faces of the rotor to prevent the material of the charge from reaching the shaft.

32. A rubber treating machine having a chamber, a rotor in the chamber, a shaft for the rotor passing through openings in the end walls of the chamber, members surrounding said shaft and received within the openings to form a portion of the end walls of the chamber and packing rings mounted upon the members and surrounding said openings within the chamber, said rings being spaced from said openings and adapted to bear against the end faces of the rotor to form an abutment for the material of the charge and prevent it reaching said openings.

33. A rubber treating machine having a chamber, a rotor in the chamber, a shaft for the rotor passing through openings in the end walls of the chamber, and packing rings mounted upon the chamber wall and surrounding said openings within the chamber, said rings being formed in two halves and adapted to bear against the end faces of the rotor to prevent the material of the charge from reaching said openings, said rings being spring pressed into contact with the rotor, and means for introducing and supporting said rings through the openings in the end walls of said chamber.

34. A rubber treating machine having a chamber, a rotor therein mounted upon a shaft extending through openings in the end walls of the chamber, members surrounding said shaft and received within the openings, and packing rings mounted in the members surrounding said openings and spaced therefrom, said members and packing rings being split along a diametrical line and adapted to be introduced and withdrawn through the openings in the end walls of the chamber, said rings being spring pressed into contact with the end faces of the rotor and forming abutments to prevent the material reaching the shaft openings.

35. A rubber treating machine having a chamber, a rotor in the chamber mounted upon a shaft extending through the end walls of the chamber, bearings for said shaft spaced from the end walls of the chamber and packing rings mounted upon said walls surrounding said openings, said rings extending from the walls in a direction longitudinally of the chamber to contact with the end faces of the rotor and prevent the material of the charge from reaching said openings and said rings being adapted to be introduced into the chamber through the openings provided in the end walls, the space between the bearings and the end walls allowing said packing rings to be withdrawn and inserted.

36. A rubber treating machine having a chamber, and a rotor within the chamber mounted upon a shaft fastened through openings in end walls of the chamber, supporting members secured to the end walls of the chamber and extending within said shaft openings, and packing rings mounted in said supports and extending therefrom in a direction longitudinally of the rotor to contact therewith.

37. A rubber treating machine having a chamber, and a rotor within the chamber mounted upon a shaft fastened through openings in end walls of the chamber, supporting members secured to the end walls of the chamber and extending within said shaft openings, packing rings loosely mounted in said supports and extending therefrom in a direction longitudinally of the rotor to contact therewith, and means for pressing said rings into contact with the faces of the rotor.

38. A rubber treating machine having a chamber, and a rotor within the chamber mounted upon a shaft fastened through openings in end walls of the chamber, supporting members secured to the end walls of the chamber and extending within said shaft openings, packing rings loosely mounted in said supports and extending therefrom in a direction longitudinally of the rotor to contact therewith, and means for pressing said rings into contact with the faces of the rotor, and means to hold said rings against rotative movement relative to the chamber wall.

39. A rubber treating machine having a mixing chamber provided with a charging opening at the upper portion thereof, a stack communicating with said opening, a plunger mounted in said stack for movement towards and away from said chamber, a guideway on said stack arranged parallel to the path of movement of said plunger, operating means carried in said guideway and connected to said plunger, and power means carried on a wall of said machine in alignment with said operating means and connected thereto, said power means being adapted to reciprocate said operating means.

40. A rubber treating machine having a mixing chamber provided with a charging opening at the upper portion thereof, a stack communicating with said openings, a plunger mounted in said stack for movement towards and away from said chamber, power operated means carried on and extending through a side wall of said stack adapted to reciprocate said plunger, and a hopper on said stack, said hopper being carried on the opposite side of said stack from said operating means.

41. A rubber treating machine having a mixing chamber provided with a charging opening at the upper portion thereof, a stack mounted on the upper surface of said mixing chamber communicating with said opening, said stack having a wall substantially tangent to the outer wall of said mixing chamber, a plunger mounted in said stack for movement towards and away from said chamber, and means carried on the substantially tangent wall of said stack and extending therethrough for reciprocating said plunger.

42. A rubber treating machine comprising a chamber, an upper charging stack communicating therewith, a plunger vertically movable in the stack, and a plunger actuating mechanism mounted alongside the stack and plunger and having an actuating part movable parallel to the plunger, said mechanism being disposed substantially wholly below the top of the stack.

43. A rubber treating machine comprising a chamber, a rotary mixing element therein, a charging stack communicating with the top of the chamber, a plunger vertically movable in said stack, and plunger actuating mechanism mounted at the side of the stack at such an elevation that the height of the stack substantially determines the height of the machine.

44. A rubber treating machine comprising a mixing chamber, a rotary mixing element therein, a charging stack communicating with the top of the chamber, a plunger slidably mounted in the stack to force material against the mixing element, and plunger actuating mechanism including an actuating member mounted at the side of the plunger for movement parallel to the plunger, said member in its upper position being substantially wholly at a level below the top of the stack.

45. A rubber treating machine comprising a mixing chamber, a rotary mixing element therein, a charging stack communicating with the top of the chamber, a plunger slidably mounted in the stack to force material against the mixing element, and plunger actuating mechanism including an actuating member mounted at the side of the plunger for movement parallel to the plunger, the space in the stack above the plunger being substantially free and unobstructed.

46. A rubber treating machine having a mixing chamber provided with a charging opening, a stack communicating with said opening, a plunger mounted for up and down movements in the stack, and a plunger operating member connected to said plunger, said operating member being disposed in parallel spaced relation to the plunger.

47. A rubber treating machine having a mixing chamber provided with a charging opening, a stack communicating with said opening, a plunger mounted for up and down movements in the stack, a plunger-operating member connected to said plunger, said operating member being disposed in parallel spaced relation to the plunger, and actuating means connected to said operating member at a point below its connection with the plunger.

48. A rubber treating machine having a mixing chamber provided with a charging opening, a stack communicating with said opening, a plunger mounted for up and down movements in the stack, a plunger-operating member connected to said plunger, said operating member being disposed in parallel spaced relation to the plunger, and a motor for actuating said operating member connected therewith and mounted on the side wall of the machine.

In witness whereof, I have hereunto set my hand this 7th day of March, 1925.

RICHARD C. LEWIS.